L. H. FAULKNER.
FLY CATCHER.
APPLICATION FILED AUG. 8, 1913.

1,087,749.

Patented Feb. 17, 1914.

Witnesses
R. M. Jones
H. Kaye Martin

Inventor
L. H. Faulkner.
By
Attorney

UNITED STATES PATENT OFFICE.

ISAAC H. FAULKNER, OF DALLAS, TEXAS.

FLY-CATCHER.

1,087,749.  Specification of Letters Patent.  Patented Feb. 17, 1914.

Application filed August 8, 1913. Serial No. 783,761.

*To all whom it may concern:*

Be it known that I, ISAAC H. FAULKNER, a citizen of the United States, residing at Dallas, in the county of Dallas and State of Texas, have invented certain new and useful Improvements in Fly-Catchers; and I do hereby declare the following to be a full, clear, and exact description of the invention, such as will enable others skilled in the art to which it appertains to make and use the same.

This invention relates to new and useful improvements in fly catchers and has for its object the provision of a device of the above character which is adapted to hold fly paper in such a way that the same may be used by the operator to trap the fly.

Another object of my invention is the provision of a device which will hold the fly paper in the shape of a funnel.

Still another object of my invention is the provision of such a device which may be cheaply constructed of wire or other suitable material and which will be strong and durable and easily manipulated.

Figure 1:
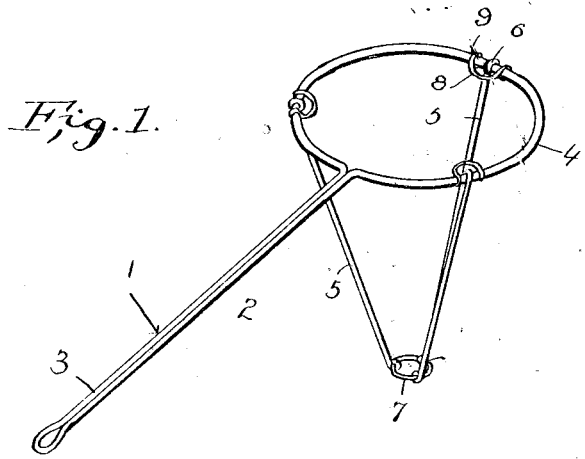
Figure 2:
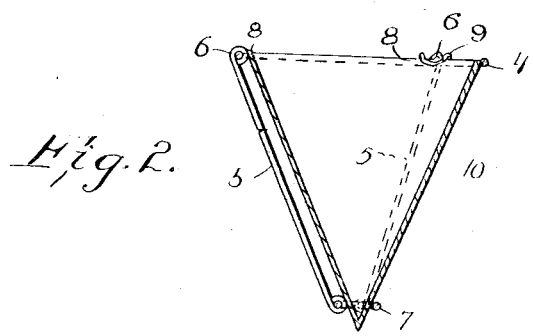

With the above and other objects in view I now proceed to describe my invention in the following specification and accompanying drawings, in which, Figure 1 is a perspective view of my improved fly catcher, and Fig. 2 is a vertical sectional view of my improved fly catcher.

Referring to the drawings by characters of reference 1 indicates the handle portion which is adapted to be gripped by the operator and comprises the wires 2 and 3. These wires 2 and 3 are bent back upon themselves as clearly illustrated and terminate at their outer extremities in the loop 4 which forms the base member of my improved fly catcher.

At suitable intervals around the loop 4 and equi-distant from each other I provide the downwardly extending wires 5 which terminate at their upper extremities in the eyes 6 which pass around and frictionally engage the loop 4. The lower extremities of the wires 5 terminate in eyes similar to those previously referred to at 6 and frictionally engage a reduced ring 7 which is of considerably smaller diameter than the loop 4, thereby causing each of the wires 5 to assume a convergent position as will be clearly seen upon referring to the drawings.

Extending inwardly from the loop 4 I preferably provide the U-shaped members 8 having the terminals of their arms bent as shown at 9 to form the eyes which frictionally engage the loop 4 and hold the U-shaped members securely in position. These U-shaped members are preferably positioned, as indicated in the drawings, in such a way that the wires 5 come between the arms of the U-shaped members thereby eliminating any unevenness intermediate the wires 5.

It will be seen that the device thus formed is particularly adapted to receive the fly paper, indicated by the numeral 10 and hold the same in the shape of a cone, having an open end, which is adapted to be placed against the wall and over the insect which is to be caught. The result will be obvious as it will be readily understood should the insect attempt to fly away it will encounter the sticky paper and become entangled therein, thus eliminating the objectionable swatting which is very often inconvenient as there is danger of contaminating any articles, or food stuffs which may be in the immediate vicinity.

While in the foregoing I have shown and described the preferred embodiment of my invention I wish it to be understood that I may change the specific arrangement of parts without in any way departing from the spirit and scope of my invention.

What I claim is:—

1. A device of the character described comprising wires, said wires being bent and extending parallel with each other to form a handle, a loop formed at the end of said handle, angularly extending wires projecting outwardly from said loop, a ring at the outer extremities of said angularly extending wires, said ring being of smaller diameter than the loop, thereby causing said wires to converge and form a funnel shaped support, and fly paper rolled to form a hollow cone, said fly paper being adapted to be inserted in the funnel shaped support and thereby be held in operative relation with the handle.

2. A device of the character described comprising a loop, a handle extending outwardly therefrom and formed integral therewith, angularly extending arms secured to said handle, a ring of less diameter than the loop, said ring being supported by the angularly extending arms, and means to retain a piece of fly paper in position.

3. A device of the character described comprising a loop, a handle extending outwardly therefrom, arms extending angularly from said loop, a ring supported by the outer extremities of the arms, said ring being of less diameter than the loop, inwardly extending projections secured to the loop immediately adjacent the arms, and a roll of fly paper adapted to be inserted in the frame thus formed, and thereby form a fly catcher.

In testimony whereof I affix my signature in presence of two witnesses.

ISAAC H. FAULKNER.

Witnesses:
 DAN DANIEL,
 S. E. YATES.